United States Patent [19]

Eberle, Jr. et al.

[11] Patent Number: 5,566,269
[45] Date of Patent: Oct. 15, 1996

[54] STRAIN RELIEVING HOLDER FOR OPTICAL FIBER CABLE

[75] Inventors: James J. Eberle, Jr., Hummelstown; Matthew J. Fasnacht, Mechanicsburg; James E. Goell, Harrisburg; John C. Hoffer, Harrisburg; Ronald R. Schaffer, Harrisburg; Francis J. Shay, Palmyra; David L. Swift, Mechanicsburg, all of Pa.

[73] Assignee: The Whitaker Corporation, Wilmington, Del.

[21] Appl. No.: 453,303

[22] Filed: May 30, 1995

[51] Int. Cl.$^6$ .................................................. G02B 6/00
[52] U.S. Cl. ........................ 385/137; 385/134; 385/135; 385/136
[58] Field of Search ................................ 385/100, 102, 385/114, 134, 135, 136, 137, 139

[56] References Cited

U.S. PATENT DOCUMENTS

| | | | |
|---|---|---|---|
| 3,768,146 | 10/1973 | Braun et al. | 385/99 X |
| 4,627,686 | 12/1986 | Szentesi | 385/135 X |
| 4,687,289 | 8/1987 | DeSanti | 385/135 X |
| 4,688,886 | 8/1987 | Stoerk | 385/137 X |
| 4,702,551 | 10/1987 | Coulombe | 385/135 X |
| 4,793,681 | 12/1988 | Barlow et al. | 385/135 |
| 4,840,449 | 6/1989 | Gnandeharizadeh | 385/135 X |
| 4,842,362 | 6/1989 | Anderton | 385/135 |
| 4,854,661 | 8/1989 | Cooper et al. | 385/99 |
| 4,911,521 | 3/1990 | Ryuto et al. | 385/135 X |
| 5,005,941 | 4/1991 | Barlow et al. | 385/135 |
| 5,044,719 | 9/1991 | Nakamura | 385/136 X |
| 5,046,811 | 9/1991 | Jung et al. | 385/15 |
| 5,069,523 | 12/1991 | Finzel et al. | 385/135 |
| 5,071,211 | 12/1991 | Debortoli et al. | 385/76 |
| 5,125,057 | 6/1992 | Aberson, Jr. et al. | 385/65 |
| 5,133,039 | 7/1992 | Dixit | 385/135 |
| 5,146,532 | 9/1992 | Hodge | 385/136 |
| 5,208,893 | 5/1993 | McCall et al. | 385/135 |
| 5,222,184 | 6/1993 | Foss | 385/135 |
| 5,278,933 | 1/1994 | Hunsinger et al. | 385/135 |
| 5,337,390 | 8/1994 | Henson et al. | 385/81 |
| 5,375,185 | 12/1994 | Hermsen et al. | 385/135 |
| 5,416,882 | 5/1995 | Hakoun et al. | 385/136 |
| 5,420,956 | 5/1995 | Grugel et al. | 385/135 |
| 5,422,974 | 6/1995 | Brown et al. | 385/136 |
| 5,471,555 | 11/1995 | Braga et al. | 385/136 |
| 5,474,178 | 12/1995 | DiViesti et al. | 206/723 |
| 5,499,314 | 3/1996 | Leite et al. | 385/135 |

OTHER PUBLICATIONS

*Siecor Catalog*, "Splice Trays", pp. 2–65 to 2–68; Siecor Corporation, Hickory, North Carolina (No Date).

*AMP Instruction Sheet 408–9490*, "AMP Organizer Holder Kits and Trays", five pages; Mar. 1993; AMP Incorporated, Harrisburg, PA.

*AMP Catalog 82188*, "Fiber Optic Products", pp. 147; Feb. 1993; AMP Incorporated, Harrisburg, PA.

*BEJED Drawing*, "BJ–1742C–005 12 Fiber Universal Splice Unit", Feb. 1994; BEJED Communication Products, Portland, OR.

*Primary Examiner*—Brian Healy
*Attorney, Agent, or Firm*—Anton P. Ness

[57] ABSTRACT

A strain relieving holder (40) having a bottom member (42) with channels (48) therealong, and top members (44,46) securable to said bottom member (42) by lugs (68) thereof being received into and held within respective channels (48). Either channels (48) of the bottom member (42) or channels (114) of the top members (44,46) may receive jacketed cable (28) thereinto for strain relief holding thereof. Slots (66) of the bottom member (42) are dimensioned to receive ribbon cables (32) (or buffered fibers 26) therein, and the top members (44,46) secure the ribbon cables (32) in the slots. Holders (40) may be used at ends of fiber optic splice trays (10).

18 Claims, 6 Drawing Sheets

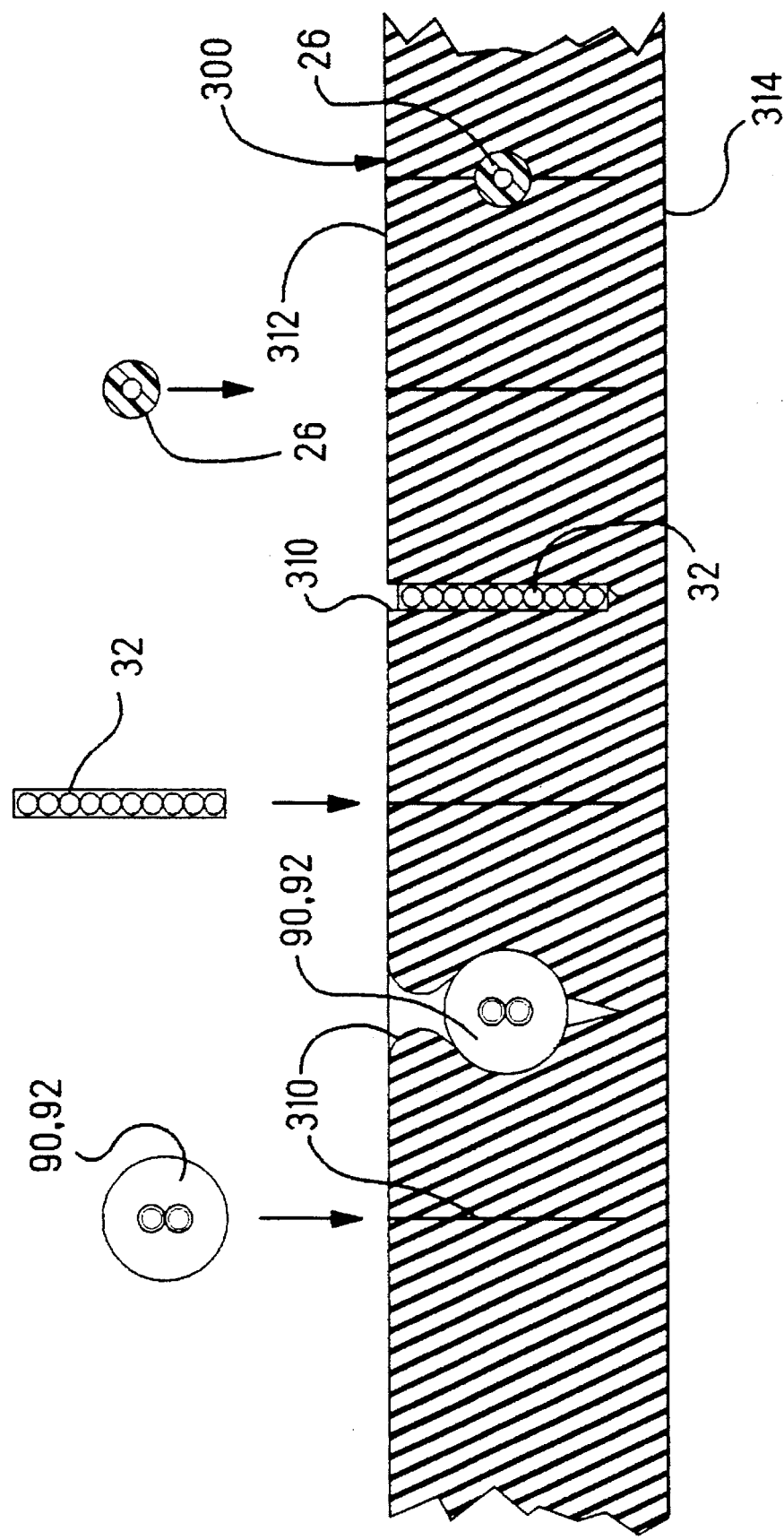

STRAIN RELIEVING HOLDER FOR OPTICAL FIBER CABLE

FIELD OF THE INVENTION

The present invention relates to the field of optical fiber interconnection and more particularly to strain relief members for optical fiber cable.

BACKGROUND OF THE INVENTION

In multiple fiber interconnection arrangements, a plurality of pairs of associated optical fibers are to be interconnected and such interconnections must thereafter be held securely and carefully, usually in an organizer tray or cassette within a larger enclosure or cabinet, and usually in an array of such trays or cassettes. Such trays must also hold generous portions of the fibers adjacent the interconnections, or splices, to permit splice repair without requiring cable replacement. Preferably the trays or cassettes also provide for securing jacketed portions of the cables containing one or more of the optical fibers, at ends of the trays. The splice connections comprise fusion of the ends or end lengths of the associated optical fibers, or adhesive bonding, or precision clamping, and the thus-fused fiber ends are preferably maintained within a protective sleeve or adapter to maintain the precision alignment of the fibers and provide a level of strain relief to the coupling.

One conventional method for securing optical fiber cables at ends of organizer trays has been to utilize cable ties that extend through holes in the bottom wall of a tray at each end and are snapped overtop of respective jacketed cable portions, or to utilize cable clamps in similar fashion. Within the tray the optical fibers are broken out from the jacket for ends of the optical fibers to be spliced or coupled, with such splice connections to be maintained within grooved holders centrally located between the tray ends or cable exits. Examples of splice trays or organizers or cassettes are disclosed in U.S. Pat. Nos. 4,627,686; 4,687,289; 4,702,551; 4,840,449; 5,069,523; and 5,222,184.

It is desired to provide a strain relief member at cable exits from a tray or organizer or cassette, that provides sufficient clamping of jacketed portions of fiber optic cables to relieve strain on the splice connection or coupling, without compressing or otherwise deforming the optical fiber therewithin.

It is also desired to provide a strain relief member for clamping of multifiber fiber optic ribbon cable to define strain relief therefor.

SUMMARY OF THE INVENTION

The present invention comprises at least a bottom member of resilient material when strain relief of only jacketed fiber optic cable is desired, and may be an assembly of the bottom member and a top member or cap of resilient material, when strain relief of smaller diameter buffered fiber or ribbon cable is desired. The strain relief bottom member is placeable at either end of an organizer or tray or at the cable exit of a cassette and may be affixed to the bottom tray wall such as by adhesive or double sided tape. The bottom member includes an array of generally parallel channels or grooves formed into and along the top surface, separated by elongate protrusions, and having constrictions along the entrances thereinto; slots of only incremental width extend from the top surface into and along each protrusion at its center and into which may be placed small diameter buffered fiber and ribbon cable, with the resilient material of the bottom member being deformable when the ribbon cable or buffered fiber of slightly greater width is urged into the slot, the slot side walls thereafter slightly compress against the ribbon cable or buffered fiber after insertion. The channels are dimensioned to receive relatively large diameter (e.g., 3 mm) jacketed cable, with the constrictions being less wide than such cable to retain the cable in the channels after placement especially after the top member is affixed to the bottom member; the slots provide for temporary widening of the constrictions during placement of the jacketed cables into the channels, by permitting outward deflection of the portions of the protrusions; and no top member is necessary when only jacketed cable is involved.

When small diameter (e.g., 900 microns) buffered fiber or small thickness (e.g., about 400 microns) multifiber ribbon cable is involved that is disposed within the small width slots in the bottom member, a top member of resilient material is utilized that includes a corresponding array of parallel elongate lugs extending below and along a bottom surface thereof to become inserted into associated ones of the channels of the bottom member, and including undercuts complementary to the constrictions of the channels to securely hold the lugs within the associated channels and thus hold the top member securely to the bottom member without other fasteners and also permitting removal of the top member when desired. For a mixture of jacketed fiber cable and either ribbon cable or buffered fiber, a top member may be used that has a lug severed from the top member at each position opposing each channel holding a jacketed fiber.

In another embodiment, bottom and top members of resilient material of slightly different configuration are used together for both jacketed fiber optic cable and also buffered fiber and ribbon cable. A bottom member includes protrusions defining channels with constrictions as before and also includes small width slots extending downwardly into the top surface in the center of the protrusions, into which buffered fiber or ribbon cable may be inserted. A top member includes elongate lugs with undercuts to be snapped into the channels of the bottom member and when positioned will close off the small width slots containing any buffered fibers or ribbon cable. Into the top surface of the top member are defined another array of channels with constrictions, with the channels having a diameter corresponding to the diameter of jacketed fiber optic cable, and with the constrictions being less wide than the cable diameter; the jacketed cable is insertable along respective top member channels by being pressed through the narrower constrictions which then secure the cables in the channels in a manner not requiring a further top member to close off the entrances to the channels.

In yet another embodiment of the strain relief member of the present invention, bottom and top members of resilient material of slightly different configuration are used for both jacketed fiber optic cable and also buffered fiber and ribbon cable. The bottom member includes an array of larger dimensioned channels separated by protrusions having slots thereinto of incremental width, and buffered fiber and ribbon cable are insertable into the slots of the bottom member. Into the top surface of the top member are slits of only incremental width extending toward the bottom surface at each of the lug locations and parallel thereto, extending to cylindrical passageways of selected diameter extending along and within the lugs. As the top member is flexed to temporarily open the slits, a jacketed cable is insertable downwardly through and along a respective slit of the top member and into the passageway, whereafter the top member is allowed to resile and hold the inserted cable under slight compression. Assured retention results from the top member being assembled to the bottom member as the constrictions interfit with the lug undercuts to retain the lugs therein and maintain the top member's slits assuredly closed, keeping all jacketed cable in the passageways. The bottom member's channels may have a generally rectangular shape in cross-section or may be more of a dovetail shape, while the top member's lug cross-section may be cylindrical for either channel cross-section shape.

It is an objective of the invention to provide a strain relief member that engages the fiber optic members without deforming them but establishes sufficient clamping to hold them in position and generate strain relief to protect the splice couplings thereof.

It is another objective to provide a strain relief member that provides such nondeforming strain relief clamping of fiber optic ribbon cable.

It is further an objective to provide a strain relief member that is adapted to receive either conventional fiber optic cable, buffered fiber or ribbon cable as desired.

It is still further an objective to provide a strain relief member that facilitates quick and simple initial placement of fiber optic cable, buffered fiber and ribbon cable thereinto.

It is yet another objective to provide such a strain relief member that easily enables removal and replacement of previously held fiber optic cable, buffered fiber and ribbon cable.

Additional advantages of the strain relief member of the present invention are that the bottom and top members may be fastened to each other without discrete fasteners, and are easily detachable from and refastenable to each other.

An embodiment of the present invention will now be described by way of example with reference to the accompanying drawings.

BRIEF DESCRIPTION OF THE DRAWINGS

FIG. 12 is a cross-section view of the splice holder of FIG. 11 showing a discrete buffered fiber, a ribbon cable and a passive device both being held in and being inserted into respective slits thereof.

DETAILED DESCRIPTION OF THE PREFERRED EMBODIMENT

Figure 1:
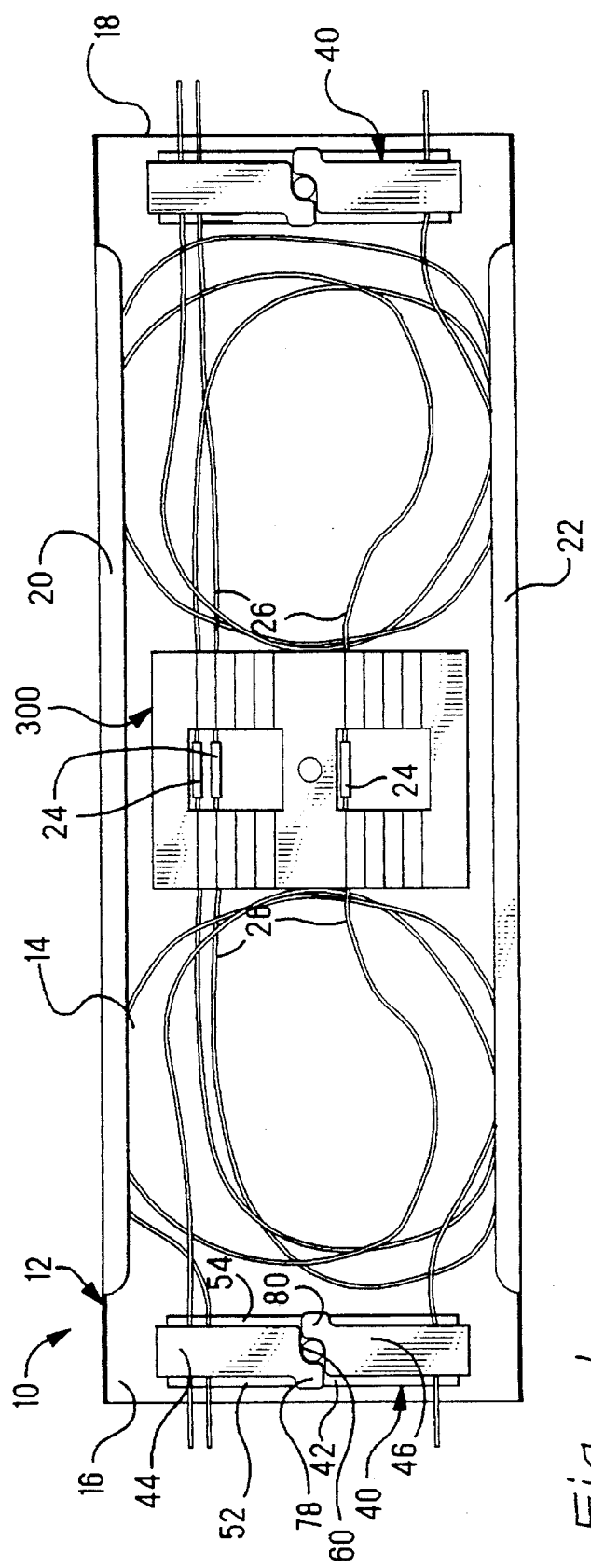
FIG. 1 is a plan view of a splice tray having cable strain relief members of the present invention at ends thereof and a splice holder centrally disposed therebetween.

A splice tray or organizer 10 includes a tray body 12 having a bottom wall 14, opposed ends 16,18 and opposed side walls 20,22, as well as a preferably transparent cover member (not shown) that is securable to tray body 12. A splice holder 300 (see FIGS. 11 and 12) is affixed to bottom wall 14 generally centrally positioned between ends 16,18 within which splice connections of pairs of associated optical fibers of single-fiber cables, or splice connections of arrays of fibers of associated ribbon cables, or passive devices joining two fiber optic members or two pairs of fiber optic members, may be positioned. Tray 10 provides substantial fiber-holding space between the ends for generous loops of discrete fibers 26 after being broken out from jacketed cables to be disposed, that would be held in tray 10 by the cover member placed thereover, with the loops being either large loops extending the length of the tray between the ends and passing by the sides of splice holder 300, or being smaller and being disposed between an end and splice holder 300.

Cable strain relief holders 40 are affixed to tray body 12 at respective ends 16,18, such as by use of adhesive or double sided tape or optionally by fasteners. In a first embodiment of strain relief holder shown in FIGS. 1 to 6, each strain relief holder 40 includes a unitary bottom member 42 and may include, as shown, a pair of top members 44,46. Bottom member 42 includes a plurality of generally parallel elongate channels 48 formed into and along top surface 50 extending between first and second ends 52,54, with elongate protrusions 56 positioned between adjacent channels 48. A central region 58 devoid of channels is shown that includes a vertical hole 60 through which may extend a vertical rod (not shown) of an enclosure for stacking of a plurality of splice trays. Splice holder 300 is shown to include a similar hole for like purpose.

Figure 4:
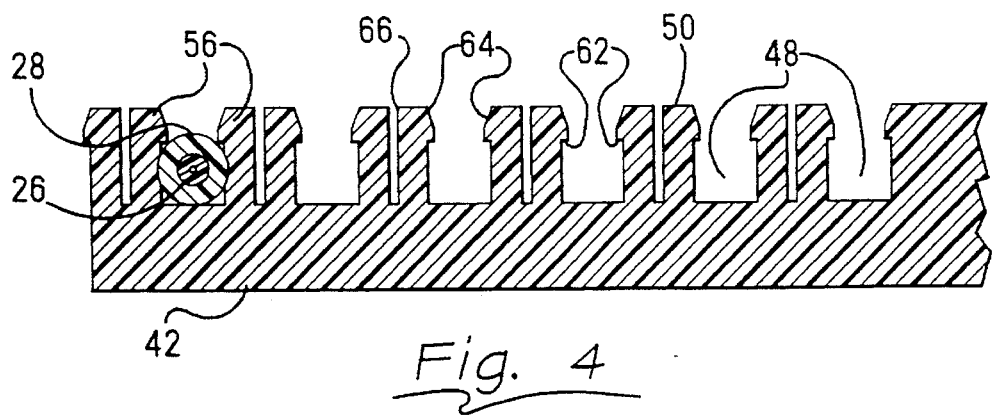

Channels 48 are dimensioned to receive thereinto, if desired, jacketed portions of fiber optic cables 28 (as shown in FIG. 4) that have for example diameters of 3 mm, and each is undercut to form retention ledges 62 near top surface 50 defining therebetween a constriction less wide than the cable that will hold a jacketed cable 28 in position once inserted, without need for top members 44,46. Preferably entrances to channels 48 include chamfers 64 to facilitate initial stages of cable insertion. It is preferred that the channels 48 be slightly less wide than the diameter of cable 28 to slightly press against the cable jacket.

Figure 3:
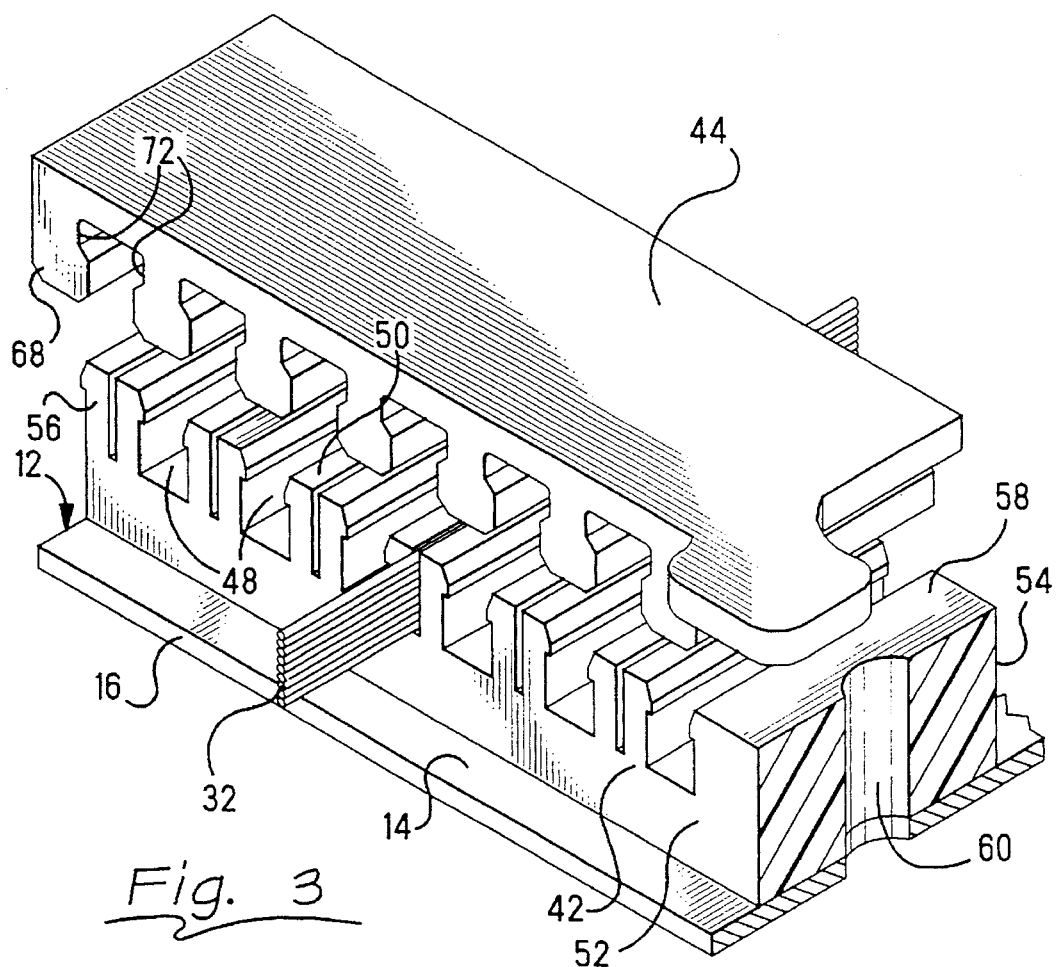
Figure 5:
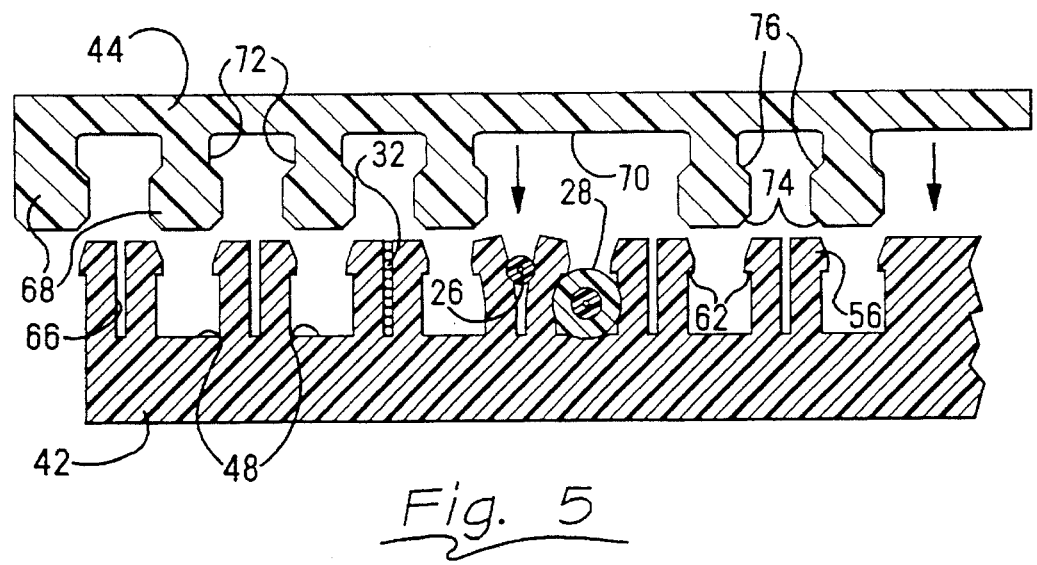
Figure 6:
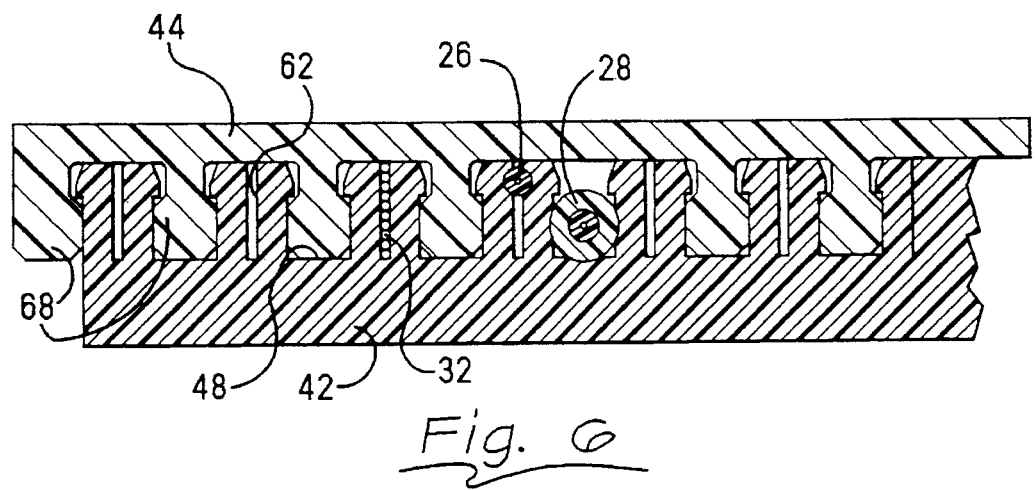

Each protrusion 56 preferably has a narrow slot 66 formed thereinto from top surface 50, with narrow slot 66 being dimensioned to approximately equal the thickness of a ribbon cable to receive thereinto a ribbon cable 32 as shown in FIG. 3. FIGS. 5 and 6 illustrate the placement of a buffered fiber 26 into a slot 66, if desired. Slots 66 also can assist in insertion of jacketed cables 28 into channels 48 by allowing upper portions of protrusions 56 to be flexed outwardly when a cable 28 is urged into the slightly narrower entrance to a channel 48 above retention ledges 62.

When holder 40 is to be used for holding either ribbon cables 32 or buffered fibers 26, top members 44,46 are used that self-fasten to bottom member 42, as shown in FIGS. 2, 3, 5 and 6. Elongate lugs 68 extend along and downwardly from bottom surface 70 of each top member 44,46 dimensioned to be fit into associated channels 48 of bottom member 42. Undercuts 72 near the base of each lug 68 cooperate with retention ledges 62 at the entrances to channels 48 for affixing top members 44,46 to bottom member 42. Also facilitating insertion of lugs 68 into channels 48 are chamfered edges 74; similarly, facilitating withdrawal of lugs 68 from channels 48 during top member removal, are chamfered edges 76 at undercuts 72.

Figure 2:
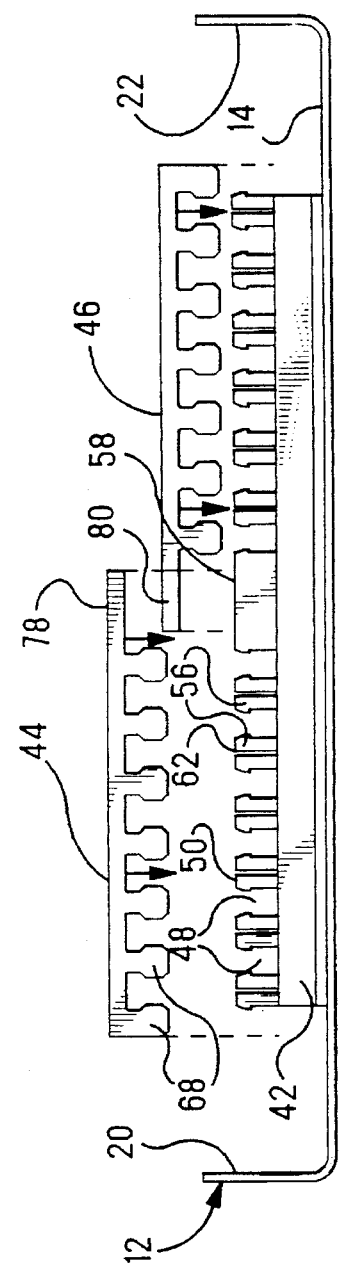
FIGS. 2 to 6 are elevation, isometric and cross-section views of the strain relief members of FIG. 1 showing representative jacketed fiber cable, buffered fiber and ribbon cable inserted thereinto.

As can be seen with reference to FIGS. 1 and 2, top members 44 and 46 are separately attachable and removable, and include lift tabs 78,80 respectively that are offset from each other atop central region 58 of bottom member 42. Lift tabs 78,80 preferably extend beyond first and second ends 52,54 respectively of bottom member 42 facilitating manual engagement, and they also define between themselves a clearance around hole 60 for a stacking rod extending through hole 60. Top members 44,46 may also be utilized where a mixture of jacketed cable 28 and either ribbon cable 32 or buffered cable 26 is desired to be used; at each location where a jacketed cable 28 is to be disposed in a channel 48, the corresponding lug 68 is removed from the top member such as by being snipped away.

It can be seen that strain relief holders 40 may be utilized within the splice tray if desired, positioned on both sides of a splice coupler site to hold adjacent portions of buffered fiber or ribbon cable. Similarly, strain relief holders may be utilized independently of a splice tray per se, for similar purposes, with the bottom surface of the bottom member affixed to a surface such as by adhesive, and with the top member, if used, snapped onto the bottom member and self-retaining thereon without other fasteners in a manner permitting removal if desired. The top member may be made for example of a thermoplastic resin such as RTP154 non-reinforced flame retardant polypropylene sold by RTP Company, Winona, Minn. The bottom member may be made for example of a thermoplastic rubber such as SANIPRENE elastomer having Part No. 25180 sold by Advanced Elastomer Systems, St. Louis, Mo. The top and bottom members preferably are individually molded; optionally, however, they may be extruded since all features (save hole 60 and lift tabs 78,80) are selected to provide the members with continuous cross-sections therealong, and the remaining features may easily be defined by simple secondary operations. Elastomeric material is preferred for bottom member 42 so that the side walls of channels 48 slightly narrower than jacketed fiber can be deformed outwardly generating compression with the jacketed cable while minimizing any possibility of compressing the fiber therewithin, and so that side walls of slots 66 slightly narrower than buffered fiber or ribbon cable can be deformed outwardly generating compression with the buffered fiber or ribbon cable without compressing the fiber or fibers. It is preferred that the slots be about 0.0015 inches wide to accommodate either ribbon cable or buffered fiber.

Figure 7:
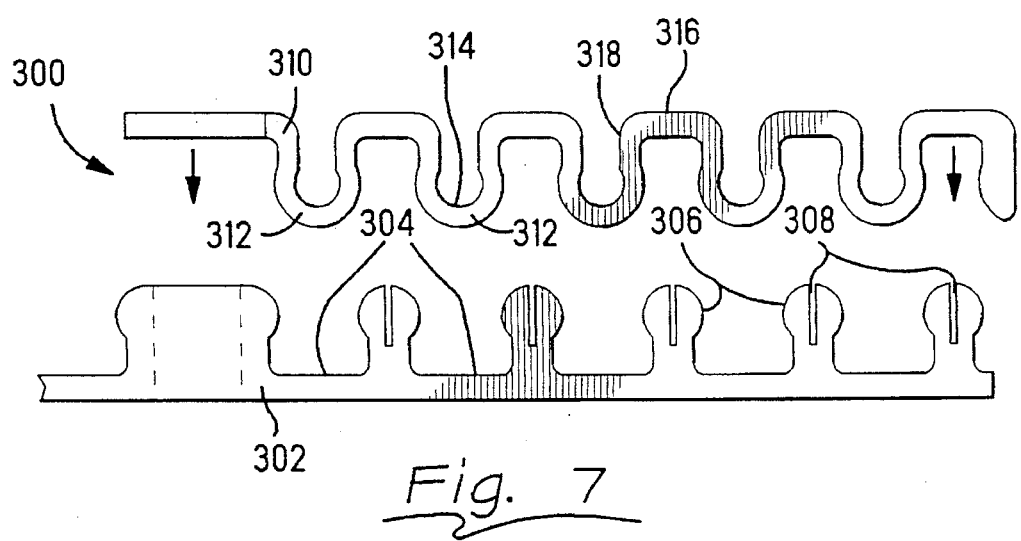
FIG. 7 is an alternate embodiment of the strain relief members of the present invention.

Another embodiment of strain relief holder assembly 100 is shown in FIG. 7, wherein bottom member 102 has channels 104 separated by split protrusions 106 that are generally cylindrical in cross-section, with narrow constrictions at the upper entrances serving to retain fiber optic cables 26 therein. Small width slots 108 are formed into protrusions 106, into which are insertable buffered fiber or ribbon cable. Top member 110 includes elongate lugs 112 generally cylindrical in cross-section to be snapped into corresponding channels 104, to interlock top member 110 with bottom member 102. Top member 110 also includes positioned between the locations of lugs 112 grooves 114 cylindrical in cross-section for receipt thereinto of jacketed cable, and the entrances to grooves 114 from top surface 116 are constrictions 118 slightly narrower than the diameter of the jacketed cable, to retain the cable in the grooves 114 once inserted. Both top and bottom members are utilized together for jacketed cable, buffered cable or ribbon cable. The top and bottom members 102,110 of strain relief assembly 100 may be extruded of thermoplastic material such as for example, polypropylene and SANIPRENE rubber as with the embodiment of FIGS. 1 to 6.

Figure 8:
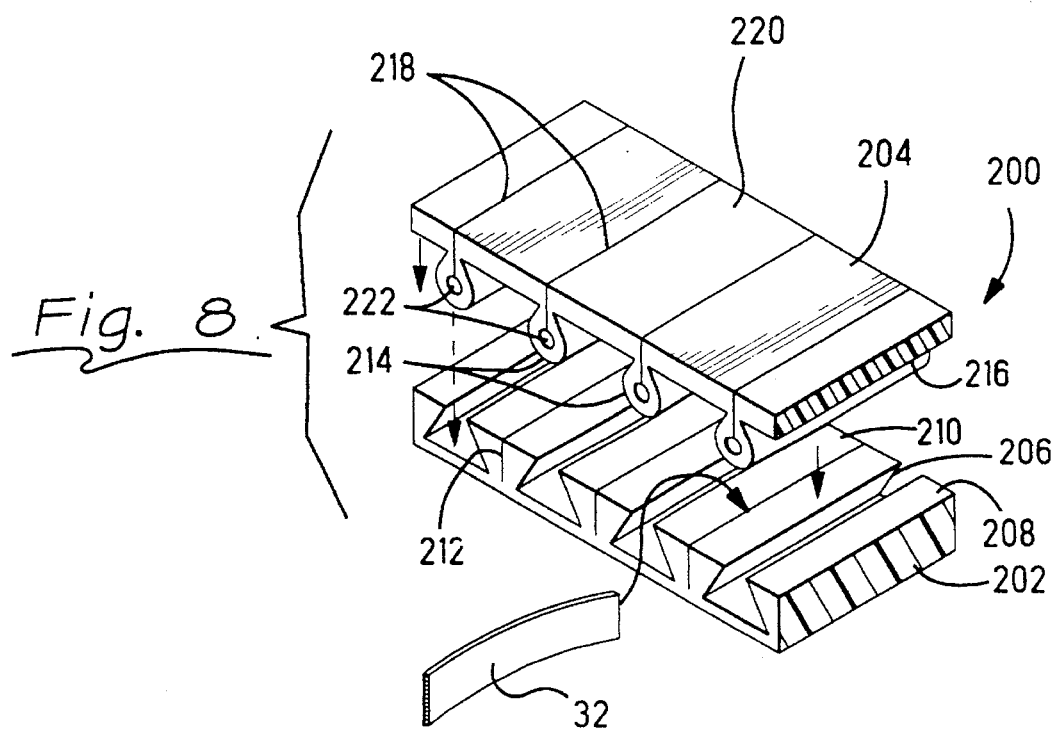
FIGS. 8 to 10 are further alternate embodiments of the strain relief members of the present invention, with FIGS. 9 and 10 being cross-section views showing different style channel cross-sections of the bottom member.
Figure 9:
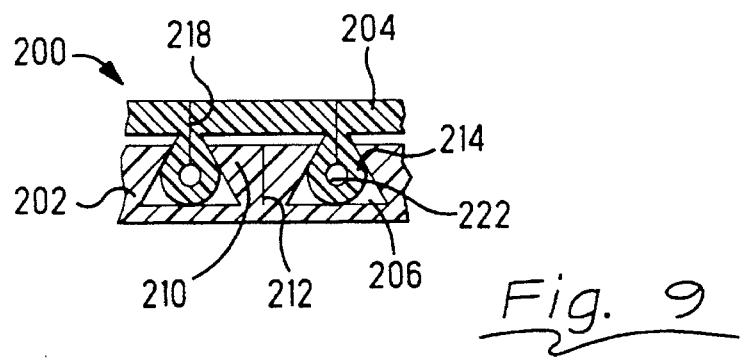

In FIGS. 8 and 9 is shown an additional embodiment of strain relief holder assembly 200 having a bottom member 202 and a top member 204. Bottom member 202 includes parallel elongate channels 206 formed into top surface 208, separated by elongate protrusions 210, with protrusions 210 being split by incremental width slits 212. Top member 204 provides elongate lugs 214 depending from bottom surface 216 and dimensioned to be received past the constrictions at entrances to channels 206 and be held therein. Incremental width slits 218 are formed into top surface 220 of top member 204 coincident with the lug locations, extending into respective lugs 214 to conclude in cylindrical passageways 222. Jacketed cable is to be held in top member 204 by being inserted downwardly through slits 218 into passageways 222, and passageways 222 are also capable of holding fusion couplings of spliced fibers so that assembly 200 may also be used as a splice holder. Ribbon cable such as 32, as well as discrete buffered fiber, is to be held in bottom member 202 by being inserted downwardly into slits 212. The interlockable top and bottom members serve to cooperate with each other to hold any of the fiber optic members described, and are also separable to repair or replace the fiber optic members. Channels 206 are shown to be of a dovetail cross-section with angled side walls converging at the upper entrance to define a constriction less wide than the diameter of the lugs 214 which are shown to be cylindrical or bulbous in cross-section.

Figure 10:
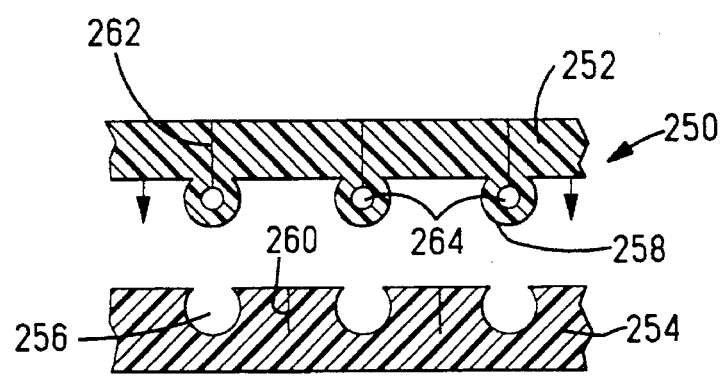

In FIG. 10 is shown a strain relief holder assembly 250 having a top member 252 similar to top member 204 of FIGS. 8 and 9. Bottom member 254 is shown to have channels 256 of cylindrical cross-section complementary to and interlockable with lugs 258 having cylindrical cross-section. As with assembly 200 of FIGS. 8 and 9, slits 260 are formed in the protrusions separating channels 256, and slits 262 of top member 252 extend to passageways 264 located within and along lugs 258, enabling assembly 250 to be utilized in similar fashion to assembly 200. As may be discerned, a variety of shapes may be devised of cross-sections of the channels of the bottom member and the lugs of the top member, that are appropriately interlockable with the channels and preferably permit separation and relocking of the top and bottom members when desired.

Figure 11:
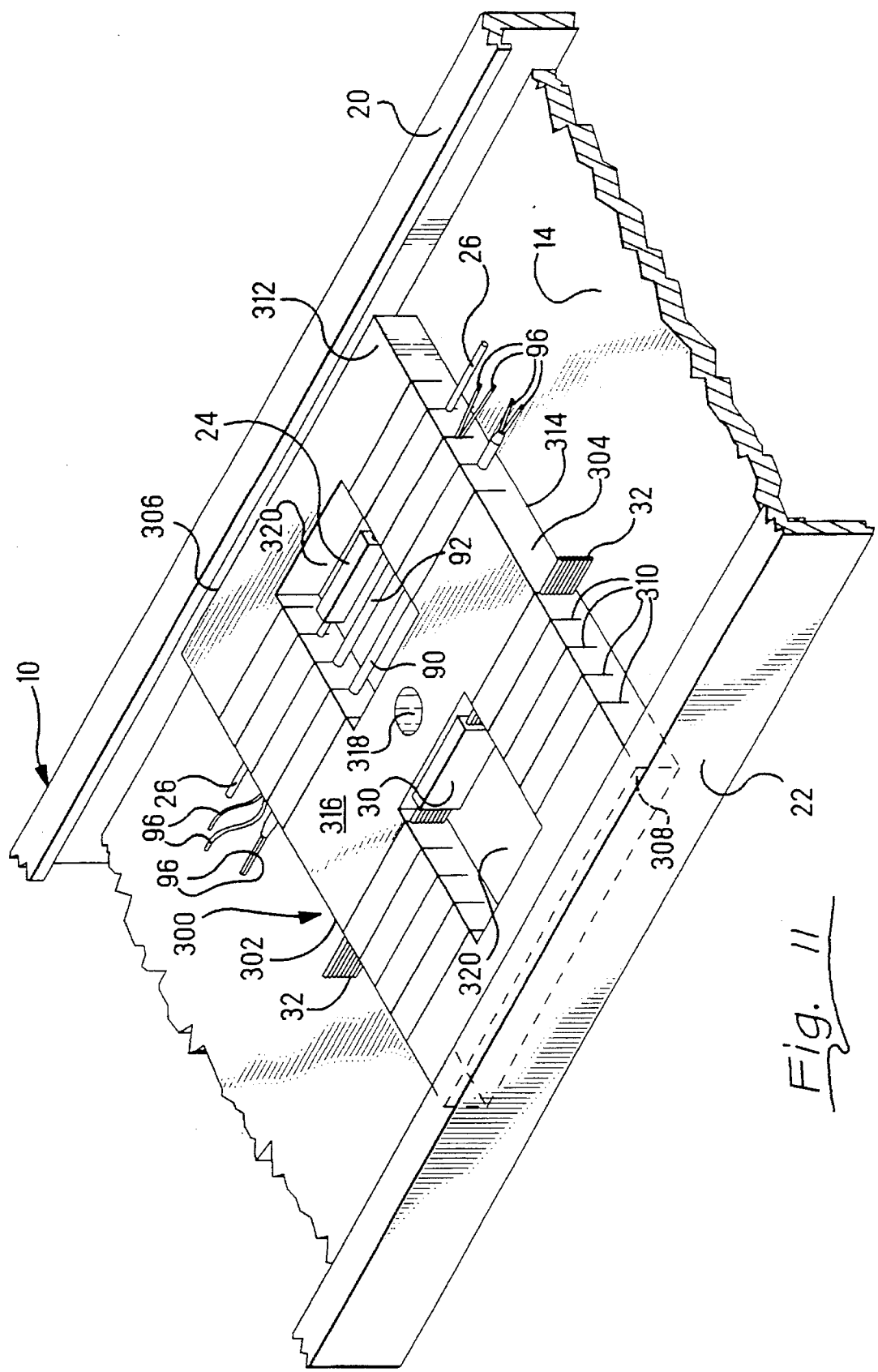
FIG. 11 is an isometric view of the splice holder of FIG. 1, with a representative single-fiber splice, a representative ribbon cable splice and a representative passive device held therein.

FIGS. 11 and 12 illustrate the splice holder 300 of FIG. 1, a generally thick planar member of elastomeric material having opposed ends 302,304 and opposed side edges 306, 308 dimensioned to be placed into splice tray 10 between side walls 20,22 and usually centrally disposed between tray ends (FIG. 1). Splice holder 300 may be easily mounted onto bottom wall 14 of splice tray 10 such as by adhesive or cement, and may utilize double sided tape and also peelable transfer paper. Each splice holder 300 may be as disclosed in U.S. patent application Ser. No. 08/453,730, pending, filed May 30, 1995.

Slits 310 are cut into top surface 312 of splice holder 300 to extend toward bottom surface 314, parallel to opposed side edges 306,308, with a central holder portion 316 remaining free of slits enabling splice tray 10 to be stacked with others thereof onto a vertical rod to extend central hole 318. Large apertures 320 are formed adjacent the middle of portion 316 of splice holder 300 to intersect slits 310. As shown, splice connections 24,30 of discrete fibers 26 and ribbon cables 32 are disposed in large apertures 320, with portions of fibers 26 and cables 32 extending therefrom through respective slits 310 to be held therein. Large apertures 320 facilitate manual gripping of splice connections 24,28 for repair and servicing if desired, and slits 310 permit easy removal from the splice holder and easy replacement thereinto.

As seen in FIG. 12, slits 310 may have essentially no width. Preferably the elastomeric material of splice holder 300 is a microcellular foam elastomeric material such as PORON high density microcellular open celled urethane, Product No. 4701-01, sold by Poron Materials Division of Rogers Corporation of East Woodstock, Conn. During insertion, a fiber or ribbon cable or passive device is urged downwardly into a slit 310 with walls thereof being urged outwardly permitting the fiber or ribbon cable to be moved into the slit. The walls resume their original abutting position above the fiber or the ribbon cable and generate a limited amount of compressive engagement with the fiber or ribbon cable or passive device, insufficient to cause any deformation thereto but enough to frictionally engage the fiber or ribbon cable or passive device to secure it in position.

The strain relieving holder of the present invention may also be used independently of a splice tray if desired by simply being secured to a selected surface in a desired orientation to receive and hold fiber optic members such as jacketed fiber optic cable, discrete buffered optical fiber or ribbon cable. Variations and modifications may occur to others that are within the spirit of the invention and the scope of the claims.

What is claimed is:

1. A holder for fiber optic members, comprising:

a bottom member of resilient material including an array of channels defined into a top surface thereof extending in parallel between opposed first and second ends, said channels being separated by protrusions therebetween, each said channel having a width complementary to a diameter of a jacketed fiber optic cable to receive a length of jacketed cable therealong, and each said channel having an entrance along said top surface and a constriction at said entrance less wide than a diameter of a jacketed fiber optic cable; and at least one top member of resilient material including a corresponding array of elongate lugs extending below and at least partially along a bottom surface thereof to become inserted into associated ones of said channels of said bottom member, and including undercuts complementary to said constrictions of said channel entrances to securely hold said lugs within associated said channels upon assembly of said at least one top member to said bottom member, whereby the top member is affixed to the bottom member without additional fastening.

2. The holder as set forth in claim 1 wherein said bottom member includes a central portion free of channels and said at least one top member includes a portion extending over at least part of said central portion and that is free of lugs thereat.

3. The holder as set forth in claim 2 wherein two top members are securable to said bottom member on respective sides of said central portion free of channels, and each said top member includes a respective tab extending over at least part of said central portion and is free of lugs, and each said tab extends beyond one of said first and second ends of said bottom member at said central portion to be engageable to lift a said top member for removal from said bottom member.

4. The holder as set forth in claim 3 wherein said tabs of said two top members are offset from each other in a direction parallel to said channels.

5. The holder as set forth in claim 1 wherein said bottom member comprises an elastomeric material.

6. The holder as set forth in claim 1 wherein said at least one top member comprises an elastomeric material.

7. The holder as set forth in claim 1 wherein each said lug includes a chamfered edge adjacent said constriction along each side thereof, adapted to bear against adjacent surfaces along said constrictions of said associated channels of said bottom member facilitating upward movement of said lugs from said channels during removal of said at least one top member from said bottom member.

8. The holder as set forth in claim 1 wherein at least one of said lug and said channel entrance includes chamfered surfaces facilitating initial entry of said lug into an associated said channel entrance at said constriction of said channel entrance upon securing of said at least one top member to said bottom member, with said chamfered surfaces of said lug defined at a leading end thereof and said chamfered surfaces of said channel entrance being defined adjacent said top surface.

9. The holder as set forth in claim 1 wherein each said protrusion of said bottom member includes a small width slot extending thereinto from said top surface having a width complementary to a width of a fiber optic ribbon cable, whereby ribbon cables may be inserted into said slots through entrances thereto along said top surface, and said at least one top member closes off said slot entrances upon being secured to said bottom member.

10. The holder as set forth in claim 9 wherein said at least one top member includes large deep channels extending into said top surface thereof at each lug location to generally be disposed within a said lug and for a bottom of each said large deep channel to be positioned beyond said bottom surface farther than said undercuts between adjacent said lugs, and each said large deep channel of said top member has a dimension adjacent said bottom thereof complementary to the diameter of a jacketed cable, and each said large deep channel includes a constriction at an entrance thereto along said top surface less wide than said cable diameter, whereby a jacketed cable is insertable into a corresponding large deep channel of said top member and is held securely therewithin upon said top member being secured to said bottom member as said protrusions of said bottom member are closely fitted within said undercuts of said lugs of said top member resisting opening of said large channels.

11. The holder as set forth in claim 10 wherein said protrusions are rounded.

12. The holder as set forth in claim 10 wherein said lugs are rounded.

13. The holder as set forth in claim 9 wherein each said at least one top member includes slits defined into a top surface thereof at each lug location and extending toward and into a respective said lug and concluding in a passageway extending from a first end to a second end of said at least one top member, and each said passageway being dimensioned to complement a diameter of a jacketed fiber optic cable, all such that said top member is flexible to open said slits when unsecured to said bottom member, whereby jacketed cables are insertable into respective said passageways from said top surface, and upon securing said top member to said bottom member, said bottom member protrusions resist opening of said slits of said top member and thus retain said jacketed cables in said passageways.

14. The holder as set forth in claim 13 wherein said channels of said bottom member are cylindrical in cross-section.

15. The holder as set forth in claim 14 wherein said lugs are rounded.

16. The holder as set forth in claim 13 wherein said channels of said bottom member are dovetailed in cross-section.

17. The holder as set forth in claim 16 wherein said lugs are rounded.

18. A fiber optic splice tray, comprising:

a tray member having a bottom wall, opposed side walls and opposed ends; and a holder affixed to said bottom wall at each of said opposed ends, each said holder comprising:

a bottom member of resilient material affixed to said bottom wall and including an array of channels defined into a top surface thereof extending in parallel between opposed first and second ends, said channels being separated by protrusions therebetween, each said channel having a width complementary to a diameter of a jacketed fiber optic cable to receive a length of jacketed cable therealong, and each said channel having an entrance along said top surface and a constriction at said entrance less wide than a diameter of a jacketed fiber optic cable; and at least one top member of resilient material including a corresponding array of elongate lugs extending below and at least partially along a bottom surface thereof to become inserted into associated ones of said channels of said bottom member, and including undercuts complementary to said constrictions of said channel entrances to securely hold said lugs within associated said channels upon assembly of said at least one top member to said bottom member, one of said bottom and at least one top member including a plurality of slots extending between opposed ends thereof dimensioned to receive thereinto respective ribbon cables, whereby channels of said holder provide holding sites for jacketed fiber optic cable and slots thereof provide holding sites for ribbon cable.

* * * * *